United States Patent [19]

Ikeda et al.

[11] Patent Number: 4,680,646
[45] Date of Patent: Jul. 14, 1987

[54] IMAGE FORMING DEVICE FOR REPRODUCING A HALF-TONE IMAGE

[75] Inventors: Yoshinori Ikeda, Taira; Takao Aoki, Abiko, both of Japan

[73] Assignee: Canon Kabushiki Kaisha, Tokyo, Japan

[21] Appl. No.: 645,083

[22] Filed: Aug. 28, 1984

[30] Foreign Application Priority Data

Sep. 5, 1983 [JP] Japan ................................ 58-162069
Sep. 5, 1983 [JP] Japan ................................ 58-162070

[51] Int. Cl.[4] ........................ H04N 1/21; H04N 1/23; H04N 1/29; G01D 15/14
[52] U.S. Cl. .................................... 358/298; 358/300; 346/160
[58] Field of Search ............................ 346/153.1, 160; 358/283, 298, 300

[56] References Cited

U.S. PATENT DOCUMENTS 4,432,634  2/1984  Tabuchi ........................... 346/160 X
4,491,875  1/1985  Kawamura ........................ 358/298

FOREIGN PATENT DOCUMENTS 2049345  12/1980  United Kingdom ................ 358/283

*Primary Examiner*—E. A. Golberg
*Assistant Examiner*—Patrick W. Foster
*Attorney, Agent, or Firm*—Fitzpatrick, Cella, Harper & Scinto

[57] ABSTRACT

There is provided an image forming device wherein a half-tone pattern having a recording portion and non-recording portion is formed on a recording medium, a value corresponding to the image density of the half-tone pattern is detected, and a high quality half-tone is obtained by controlling image signals by the above detection output or quantization means for the binary or multi-value conversion of image signals.

19 Claims, 20 Drawing Figures

IMAGE FORMING DEVICE FOR REPRODUCING A HALF-TONE IMAGE

BACKGROUND OF THE INVENTION

1. Field of the Invention

The present invention relates to an image forming device capable of reproducing a half-tone image, and in particular, to image forming means for reproducing a half-tone image in terms of an area ratio between a portion to be recorded and a portion not to be recorded.

2. Description of the Prior Art

In prior art light beam scan type electronic photograph copying devices such as a laser beam printer, a LED printer and a LCD printer, surface potential control of a photosensitive member has been generally performed to obtain a stable copy image of good quality. That is, a bright part potential is formed on the photosensitive member by radiation with light beam, typically a laser beam. A dark part potential is also formed by erasing the light beam. Each of those potentials is detected with a specified sensor at the same time. A beam output typically of the laser beam or a high voltage output of a charger is controlled, thereby the beam is converged to a desired bright part potential or a desired dark part potential.

However, with such prior art potential control system, when a latent image of an original is formed after a potential control, difference in potential distribution of a single dot of the dither matrix relating to a picture element (pix) forms a part of a half-tone latent image occurs due to change in a slope of latent image characteristics (E-V characteristics) of the photosensitive member or to change in a light intensity distribution of a light beam such as a laser beam. As a result, half-tone reproducibility or sharpness of the image after development is lowered, and a stability of picture quality at the half-tone part cannot be obtained.

In addition, the prior art potential control system has a drawback in that even if a stable dot latent image is formed, a threshold value of development for the dot latent image is changed due to the change in development characteristics according to environmental conditions, variation of developer by lot, or developer deterioration. Particularly, in the case of an electronic colour photographing device, such half-tone part picture quality variation has been a fatal problem since it appears as a colour balance imperfection.

SUMMARY OF THE INVENTION

An object of the present invention is to provide an image forming device capable of obtaining a good half-tone reproducibility and a high picture quality, and, in addition, capable of maintaining a good picture quality at a constant level.

A further object of the present invention is to provide an image forming device capable of obtaining images of high picture quality having good half-tone reproducibility by performing a novel potential control in equipment using an electrostatic recording medium.

A further object of the present invention is to provide an original copying equipment featured by good half-tone reproducibility.

The present invention is characterized in that a half-tone pattern having a recording portion and a non-recording portion is formed on a recording medium, a value corresponding to an image density of the half-tone pattern is detected, and a good half-tone is obtained by controlling an image signal or quantization means for the binary or multi-value conversion of the image signal on the basis of the above detection output.

The novel features which are believed to be characteristic of this invention together with further objects will be better understood from the following description in connection with the accompanying drawings.

DETAILED DESCRIPTION OF THE PREFERRED EMBODIMENT

The present invention will now be described in detail with reference to the accompanying drawings.

Figure 1:
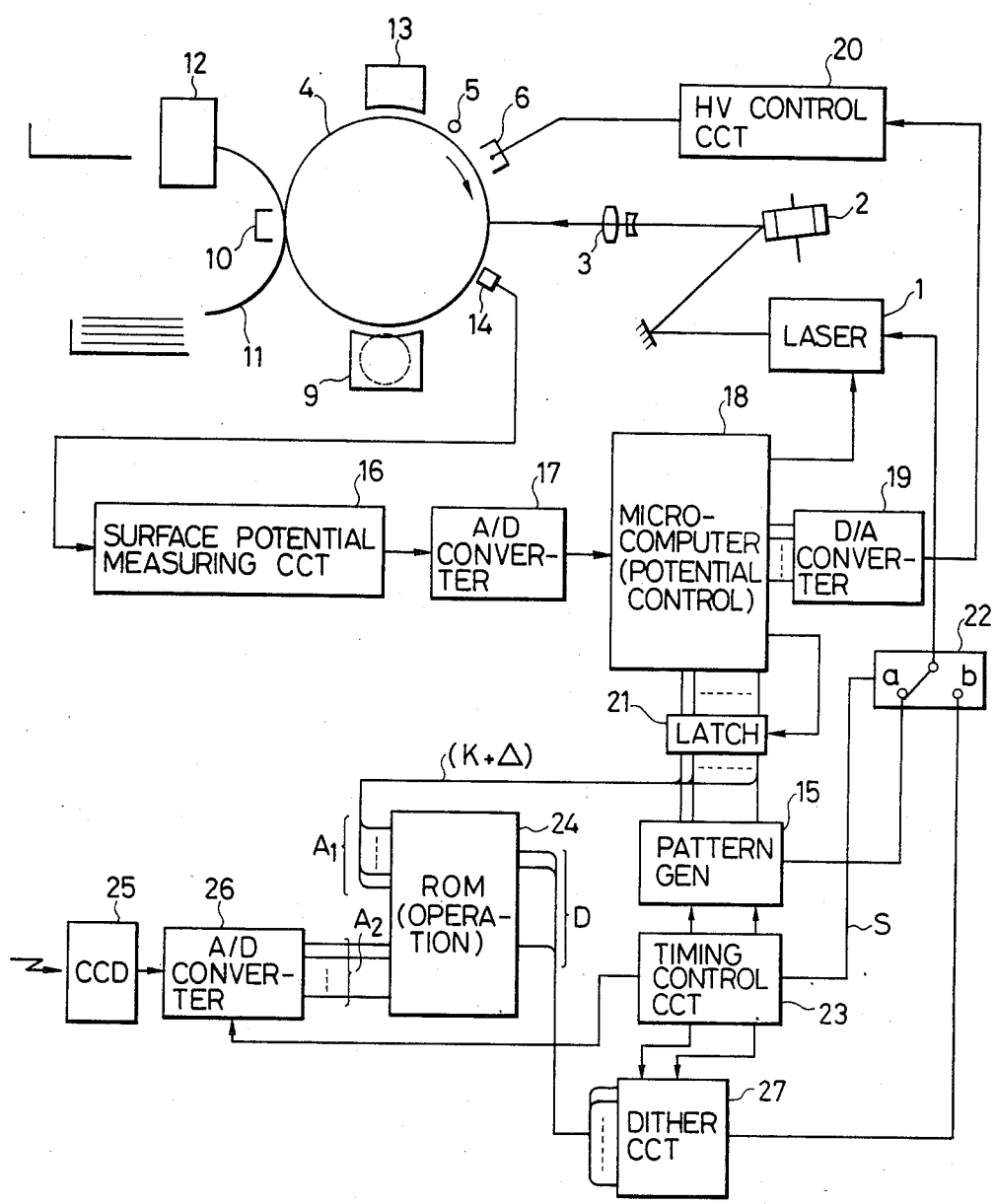
FIG. 1 shows a configuratrion of a first embodiment of an image forming device of the present invention mainly in the form of a block diagram.

FIG. 1 shows an example of the configuration of the image forming device of the present invention. Referring to FIG. 1, a recording image signal is fed into a semiconductor laser 1 from a later-mentioned data selector, and a laser beam modulated by such image signal is generated. Directing the laser beam thus modulated onto a photosensitive drum 4 through a scanner mirror 2 and an f·θ lens 3, the photosensitive drum 4 is scanned in its longitudinal direction. In addition, the photosensitive drum 4 rotates in the direction shown by the arrow. As a result, two dimensional scan is made possible on a photosensitive surface of the photosensitive drum 4 with the laser beam.

An organic photoconductor material is used as the photosensitive drum 4. The potential of the photosensitive surface of the photosensitive drum 4 is equalized by utilizing a pre-exposure lamp 5. After negative charging at a charger 6, laser beam exposure is performed, and an electrostatic latent image is formed on the photosensitive surface. The electrostatic latent image is made visible by a developing unit 9. The visible image is transferred onto a copy sheet 11 by a transfer charger 10, and is fixed by a fixing unit 12., Toner remaining on the photosensitive drum 4 which has not been transferred is collected by a cleaner 13.

Figure 4:
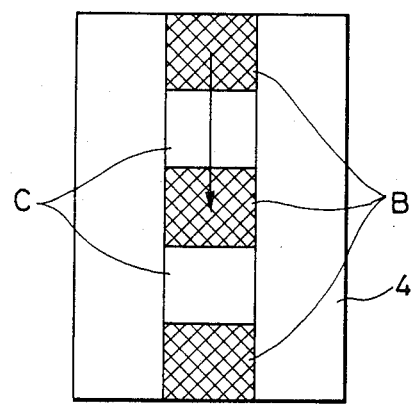
FIG. 4 is a view showing an example of the 100% dark part and 100% bright part latent image pattern for detection of a potential in the device of FIG. 1.

On the other hand, a probe 14 of a surface potentiometer is disposed adjacent to the surface of the photosensitive drum 4 after the laser beam exposure, and the potential of the latent image pattern shown in FIG. 4 formed on the photosensitive drum 4 at the time of surface potential control is detected by the probe 14.

Figure 2:
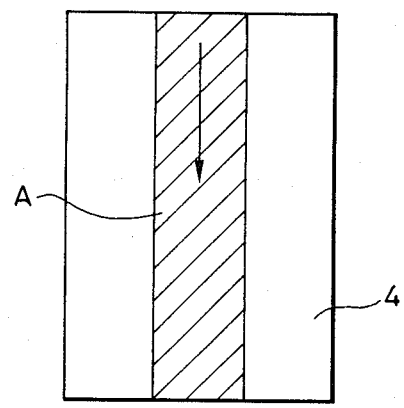
FIG. 2 is a view illustrating an example of a half-tone latent image pattern for detection of a potential in the device of FIG. 1.

FIG. 2 shows an example of the pattern for the use of the detection of the approximate mean potential of the dot latent image in the half-tone part according to the present invention. A striped area A shown by diagonal lines in the direction of rotation of the surface of the photosensitive drum 4 arranged on the plane at the time of potential control is optically scanned based on signals having been output from a pattern generator 15. As a result, a halftone pattern as shown in FIG. 3 is formed in the area A.

Figures 3A, 3B, 3C:
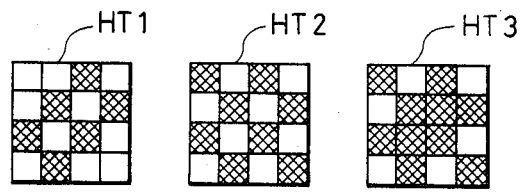
FIG. 3 (A) through (C) are enlarged views of three examples of dot arrangement relating to a single picture element of a half-tone latent image in the area A of FIG. 2.

FIG. 3 (A) through FIG. 3 (C) are enlarged views of three examples of picture element patterns HT1 through HT3 of half-tone dot latent image to be formed in the area A of FIG. 2. In these picture element patterns PT1 through PT3, the half-tone of original information is represented by the binary dither method. In this case, dot density of 16 dots/mm is employed typically. Picture elements HT1 through HT3 show an example of the change of a dither pattern to be output from the pattern generator 15 at the time of potential control. In the areas A of FIG. 2, it is designed that control can be made to change from the standard half-tone pattern HT2 to the brighter pattern HT1 or the darker pattern HT3.

FIG. 4 shows a pattern for performing the potential detection of latent images of the 100% dark part B and 100% bright part C. Prior to the output of the half-tone pattern to the area A of FIG. 2, patterns of the 100% dark part B and the 100% bright part C are formed in the same striped area as the area A of FIG. 2. Here, the 100% dark part B is an area obtained by stopping the laser output, while the 100% bright part C is an area obtained by radiating the laser output. Though the potential control of the 100% dark part B and the 100% bright part C is not necessarily required, it contributes to the enhancement of the control effect of the present invention. Patterns of FIG. 2 through FIG. 4 are stored in a memory in the pattern generator 15.

The potential control portion will now be described.

First, the latent image pattern of FIG. 4 is formed on the photosensitive drum 4 based on the output from the pattern generator 15, the potential of the 100% dark part B on the photosensitive drum 4 and the potential of the 100% bright part C are measured alternately by the probe 14 of the surface potentiometer, and the measured value is fed to a potential control microcomputer 18 through a surface potential measuring circuit 16 and an A/D converter 17.

The microcomputer 18 performs an operation according to a specified control formula so as to converge the measured potential value to a predetermined set point. A signal representing the operation result is fed to a high voltage control circuit 20 from the microcomputer 18 through an A/D converter 19, and charging current of a charger 6 is controlled according to this signal. At the same time, the signal of operation result is fed also to a laser 1 from the microcomputer 18, and the laser beam intensity is controlled according to that signal.

With reference to the flow chart in FIGURES, an example of potential control action of the device of the present invention shown in FIG. 1 will now be described in more detail.

Potential control action is performed before the original exposure according to the COPY command. For this reason, ordinary potential cleaning (step ST1) is performed by the pre-rotation process of the photosensitive drum 4. Then, the output of semiconductor laser is switched off, and a 100% dark part latent image is formed in the area B on the photosensitive drum 4 as shown in FIG. 4 by the primary charging current of the initial value. A 100% bright part latent image is also formed in the area C on the photosensitive drum 4 by the primary charging current of the initial value and the semiconductor laser driving current. Latent image potentials $V_D$ and $V_L$ are measured by the potential measuring probe 14 (steps ST2 and ST3).

Then, a judgement is made whether the absolute value ($|V_D-V_{D0}|$) of the difference between the measured value $V_D$ of the dark part potential and a predetermined set point $V_{D0}$ of that potential is within a predetermined tolerance ($C_1$) and also whether the absolute value of difference ($|V_L-V_{L0}|$) between the measured $V_L$ of the bright part potential and the set point $V_{L0}$ of that potential is within a predetermined tolerance ($C_2$). (step ST4).

When the judgement in step ST4 is negative, the charging current $I_1$ of the charger 6 (a high voltage transformer connected thereto has a constant current characteristic) is controlled according to the following control formula. (step ST5).

$$\Delta I_1 = \chi |V_D - V_{D0}| = \chi \cdot \Delta V_C$$

where $\chi$ is a constant. The driving current $I_2$ of the semiconductor laser is controlled by the following control formula (step ST6).

$$\Delta I_2 = \beta_1 V_D + \beta_2 \Delta V_L$$

where $\beta_1$ and $\beta_2$ are constants, and $\Delta V_L = |V_L - V_{L0}|$.

The operation returns to step ST2 again, and steps ST2 through ST8 are repeated until the following expressions are satisfied, that is, until step ST4 results in an affirmative judgement.

$$|V_D - V_{D0}| \leq C_1$$

and $$|V_L - V_{L0}| \leq C_2$$

When step ST4 relates in an affirmative judgement, the control operation goes out of the above loop, and proceeds to step ST7.

Then, in step ST4, a half-tone latent image is formed in the area A (refer to FIG. 2) on the photosensitive drum 4 by the pattern generator 15. The half-tone dot latent image is formed when the microcomputer 18 first outputs a reference value K (an integral parameter) to a latch 21, and the pattern generator 15 generates a pattern of dot area percentage K (%) upon the reception thereof. The output signal of the pattern generator 15 is fed to the semiconductor laser 1 via a data selector 22, and the laser output beam ON-OFF is controlled. Accordingly, a timing control circuit 23 controls by its control signal S so that the data selector 22 is connected to the a side as shown. The approximate mean potential of the dot latent image thus formed is measured by the probe 14 of the surface potentiometer.

Figure 6A:
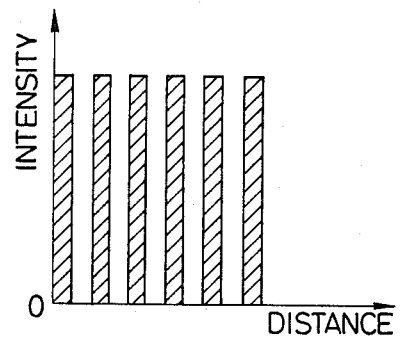
FIG. 6A through FIG. 6C are characteristic diagrams of light intensity, latent image potential, and detection output respectively for explaining a mean potential measurement of the half-tone part of the device of FIG. 1.
Figure 6B:
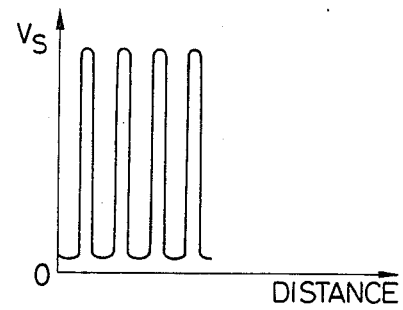
Figure 6C:
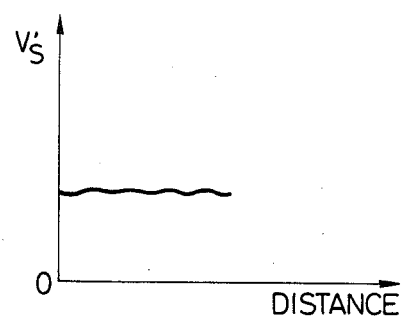

FIG. 6 (A) through FIG. 6 (C) are characteristic diagrams for the explanation of the potential detection of the half-tone part. FIG. 6 (A) shows an example of the distribution of the laser beam intensity for the exposure of the area A of the photosensitive drum 4 shown in FIG. 2. FIG. 6 (B) shows an example of the latent image potential Vs of the latent image pattern when the laser beam exposure having the light intensity distribution shown in FIG. 6 (A) is performed on the surface of the photosensitive drum 4. FIG. 6 (C) shows the detected output Vs' when the latent image pattern shown in FIG. 6 (B) is relatively scanned by the probe 14 of the surface potentiometer.

As shown in FIG. 6 (C), the probe 14 does not detect the potential of the non-exposure part of FIG. 6 (B) individually but detects the potential of the non-exposure part as a mean or a fixed value smaller than the mean. For example, when the potentials of the OFF portion and the ON portion of the laser output of a wide area are $-750$ V and $-170$ V respectively, the detected mean potential of the dot pattern of the half-tone pattern HT2 shown in FIG. 3 (B) when the dot density is at 16 dots/mm is $-380$ V.

Then in step ST8, a judgement is made whether the absolute value $|V_H - V_{H0}|$ of the difference between the potential $V_H$ measured in step ST7 and the set point $V_{H0}$ is within the tolerance (C3). If the result of judgement is negative, the microcomputer charges the output value K to the latch 21 by $\pm \Delta$ (step ST9), then the operation returns to ST7 again, and the aforementioned operations are repeated.

According to the value of K, the dot latent image in the area A of FIG. 2 changes in its dot area percentage like the half-tone patterns HT1 through HT3 shown in FIG. 3 (A) through FIG. 3 (C), for example. The operations from step ST7 to step ST9 are repeated until the following expression is satisfied.

$$|V_H - V_{H0}| \leq C_3$$

When the judgement result in step ST8 becomes affirmative, the operation exits from such potential control loop, and the potential control operation ends.

By the above operation, the charging current $I_1$ of the charger 6, driving current $I_2$, a parameter K for the latch 21 are set so that latent image potentials $V_D$, $V_L$, and $V_H$ come within predetermined values.

Coefficients $\chi$, $\beta_1$, and $\beta_2$ of the aforementioned control equation indicate the slope of function in respective relationship equations.

Here, in step ST8, the output value from the microcomputer 18 to the latch 21, for example, $(K+\Delta)$ (integral parameter), when the condition $|V_H - V_{H0}| \leq C_3$ is satisfied is supplied as a part $A_1$ of the address of an operational memory ROM 24. This output value $(K+\Delta)$ is a final value to be obtained in step ST8 when the condition $|V_H - V_{H0}| \leq C_3$ is satisfied when the potential of the pattern of dot area percentage $(K+\Delta)\%$ generated from the pattern generator 15 is measured. This final value is fixed after the completion of potential control.

Then, when reproducing the image, the data selector 22 is changed to the b side shown by a control signal S from the timing control circuit 23. Image data read from the pickup device, typically CCD 25, is fed to the A/D converter 26, and the output value thereof is supplied to the operational ROM 24 as a remaining part $A_2$ of the address. Data converted output D is obtained from the operational ROM 24. The operational ROM 24 outputs data to be addressed by address $A_1$ (typically a fixed value of the upper bits $(K+\Delta)$) and address $A_2$ (an image data stored in the address $A_2$ is assumed to be M) is output. The value of this output D is as follows.

$$D = M \times \left( \frac{K + \Delta}{K} \right)$$

That is, the output data D corresponds to an image data at an address specified by both correction address $A_1$ for correcting the half-tone gradation by the potential control and ordinary address $A_2$ in contrast to image data M corresponding to usual image detection output $A_2$.

Data D from the operational ROM 24 subjected to the half-tone correction is sent out to a dither circuit 27. A signal dither processed at the dither circuit 27 is fed to the semiconductor laser 1 via the data selector 22, and modulates its output laser beam. In this manner, a laser beam representing a dot image is output toward the photosensitive drum 4.

Though in this embodiment image data correction is performed at the operational ROM 24, image data correction may be made at the dither circuit 27 by changing its threshold value.

A second embodiment of the present invention will now be described.

Figure 7:
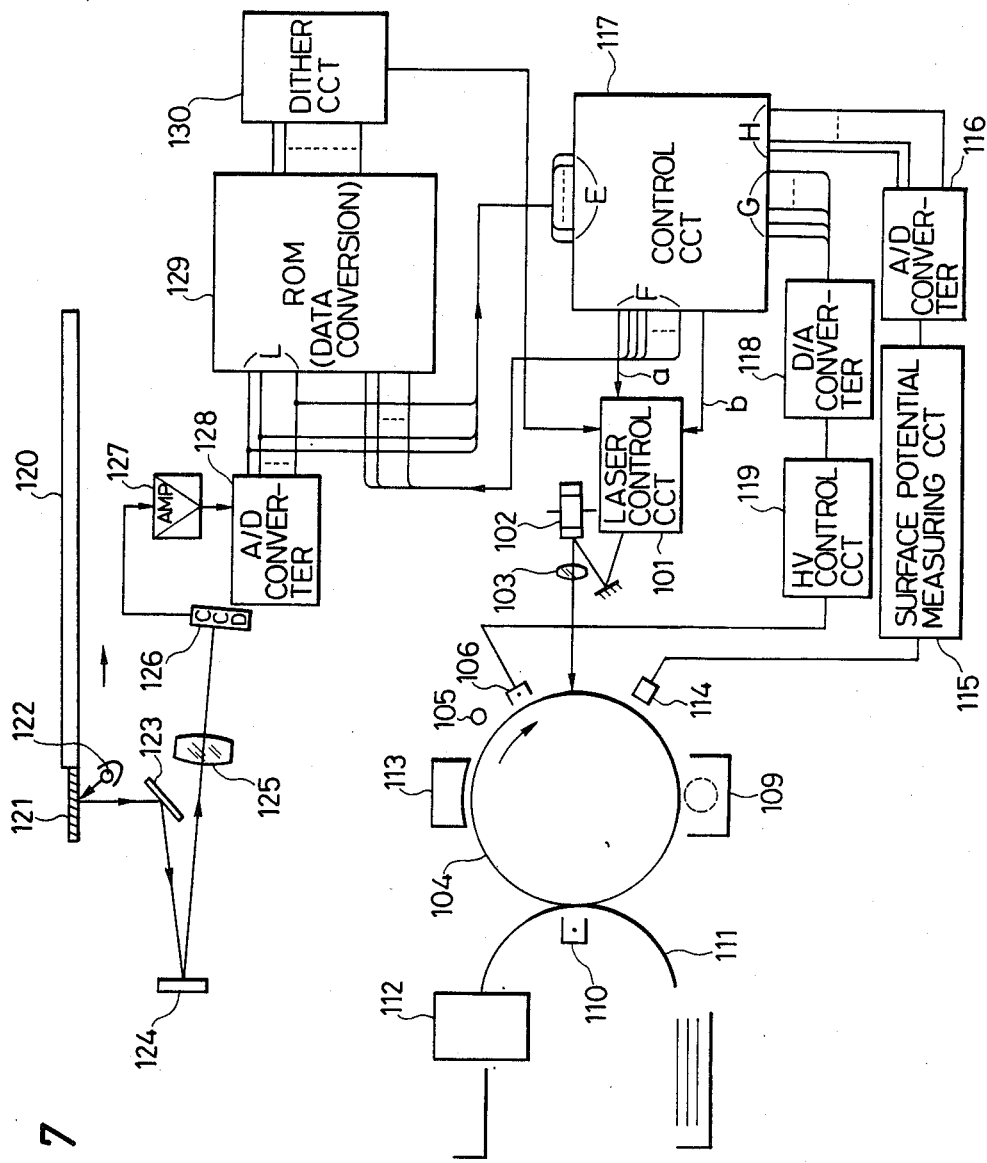
FIG. 7 shows a schematic configuration of a second embodiment of the present invention mainly in the form of a block diagram.

FIG. 7 shows an example of the configuration of the original copying equipment. As shown, a photosensitive drum 104 is scanned in its longitudinal direction by the laser beam modulated by a laser control circuit 101 according to the electric signal to be fed to the laser control circuit 101 by a scanner mirror 102 and an f·θ lens 103. Moreover, the photosensitive drum 104 is turned in the direction shown by the arrow, thereby enabling the laser beam to scan in the two-dimentional fashion. The photosensitive drum 104 is of an orgaric photoconductor. The potential of the photosensitive surface of the photosensitive drum 104 is made uniform by a pre-exposure lamp 105. Negative charging is performed by a charger 106. Then laser beam exposure is performed, and an electrostatic latent image is formed on the photosensitive surface. The electrostatic latent image is made visible by a developing unit 109. The image is transferred on a copy sheet 111 by a transfer charger 110, and then the image is fixed by a fixing unit 112. The toner remaining on the photosensitive drum 104 which has not been transferred is collected by a cleaner 113.

On the other hand, a probe 114 of the surface potentiometer is disposed adjacent the surface of the photosensitive drum 104 in a position after laser beam exposure, and the potential of the latent image formed on the photosensitive drum 104 is measured by the probe 114 at the time of surface potential control. In addition, the potential value measured by the probe 114 is fed to a control circuit 117 through a surface potential measuring circuit 115 and an A/D (analog to digital) converter 116, and arithmetic operation is performed according to a specified control equation so that measured potential value meets the predetermined set point. The signal representing the operation result is sent out from the control circuit 117 and fed to a high voltage control circuit 119 through the D/A (digital to analog) converter 118. The charging current of the charger 106 is controlled according to that signal. At the same time, the signal representing the operation result is also fed to a laser drive 101, and the laser beam intensity is controlled according to that signal.

The potential control operation of the device of the present invention shown in FIG. 7 will be described in more detail by way of example with reference to a flow chart of FIG. 8.

Figure 9:
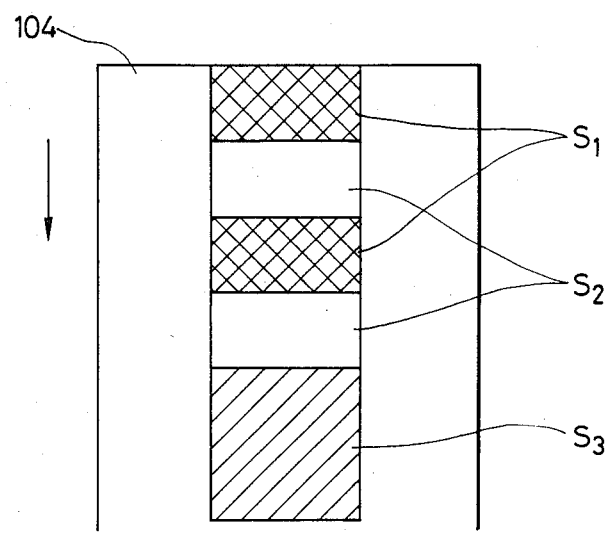
FIG. 9 is a view for explaining an example of the latent image pattern for detection of a potential in the device of FIG. 7.

Potential control operation is performed before the original exposure according to the COPY command. For this purpose, ordinary potential cleaning is performed by the pre-rotation process of the photosensitive drum 104 (step ST1'). Then, the output of the semiconductor laser is switched off, a dark part latent image is formed in the area $S_1$ on the photosensitive drum 104 as shown in FIG. 9 by the primary charging current of the initial value, a bright part latent image is formed in the area $S_2$ on the photosensitive drum 104 by the primary charging current of the initial value and the semiconductor laser driving current, and the respective latent image potentials $V_D$ and $V_L$ are measured by the potential measuring probe 114 (steps ST2' and ST3'). Then, whether the absolute value ($|V_D-V_{D0}|)=\Delta V_D$ of the difference between the measured latent image potential of the dark part latent image area $S_1$ and the predetermined set point $V_{D0}$ of that potential is within a predetermined tolerance ($C_1$) and also whether the absolute value ($|V_L-V_{L0}|)=\Delta V_L$ of difference between the measured latent image potential $V_L$ of the bright part latent image area $S_2$ latent image and a predetermined set point $V_{L0}$ of the potential is within a predetermined tolerance ($C_2$) are judged (step ST4'). If the judgement result of step ST4' is negative, the charging current $I_1$ of the primary charger 106 is controlled to $I_1+\Delta I_1$ according to the control equation $\Delta I_1 = \chi \Delta V_D$ ($\chi$ is a constant) (step ST5'), and the driving current $I_2$ of the semiconductor laser is controlled to $I_2+\Delta I_1$ according to the control equation $\Delta I_2 = \beta_1 \Delta V_D + \beta_2 \Delta V_L$ ($\beta_1$ and $\beta_2$ are consant) (step ST6'), the operation returns to step ST2 again, and the operations of steps ST2' through ST6' are repeated until the judgement result in step ST4' becomes affirmative.

When the judgement result in step ST4' becomes affirmative, the sequence exits from the above loop, and proceeds to step ST7'. In step ST7', a standard reflector 121 of gray provided at the front end of an original holder 120 shown in FIG. 7 is illuminated by a halogen lamp 122, an image is formed on a CCD 126 by directing the reflected light through mirrors 123, 124 and a condenser lens 125, half-tone image data read out from the CCD 126 is stored in a data conversion ROM 129 temporarily through an amplifier (AMP) 127 and an A/D converter 128, the semiconductor laser is modulated at the laser control circuit 101 by a signal process by the dither method at a dither circuit 130, and a uniform half-tone latent image is formed in the area $S_3$ on the surface of the drum 104 as shown in FIG. 101. Approximate mean potential $V_H$ of the half-tone pattern (dot latent image) thus formed is measured by the probe 114.

Figures 10A, 10B, 10C:
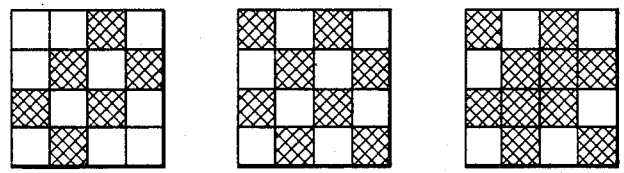
FIG. 10 (A) through FIG. 10 (C) are enlarged views of three examples of dot arrangement relating to a single picture element of the half-tone pattern in Area $S_3$ of FIG. 9.

FIG. 10 (A) through FIG. 10 (C) show examples of enlarged views of a single picture element of the half-tone pattern to be formed in area $S_3$ of FIG. 9, respectively. In this manner, the half-tone of the standard reflector 121 is represented by the binary dither method. Dot density typically at 16 dots/mm is employed at this time. FIG. 10 (A) through FIG. 10 (C) show an example when the area ratio of the recording portion and the non-recording portion at the time of half-tone potential control is changed. For example, the half-tone dot latent image is controlled from the standard pattern of FIG. 10 (B) to the pattern of FIG. 10 (A) or the pattern of FIG. 10 (C).

Figure 11A:
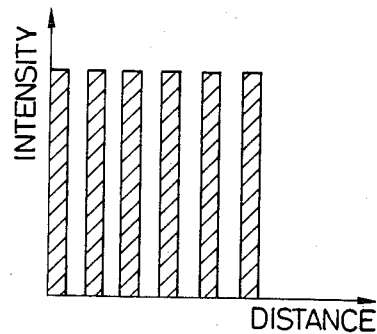
FIG. 11 (A) through FIG. 11 (C) are characteristics diagrams for explaining a mean potential measurement of the device of FIG. 7.
Figure 11B:
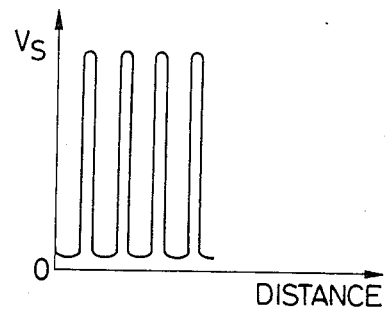
Figure 11C:
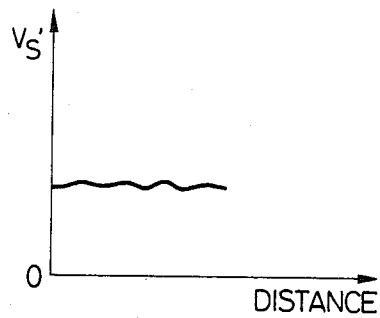

FIG. 11 (A) through FIG. 11 (C) are characteristic diagrams for the explanation of the half-tone potential detection in this example. FIG. 11 (A) shows an example of light intensity distribution of the laser beam for the scanning and exposure of the photosensitive drum 104. FIG. 11 (B) shows an example of latent image potential $V_S$ of the latent image pattern of the photosensitive drum 104 when exposure is performed by a laser beam having the light intensity distribution shown in FIG. 11 (A). FIG. 11 (C) shows the detected output $V_S'$ when the latent image pattern shown in FIG. 11 (B) is scanned relatively by the probe 114. As shown in FIG. 11 (C), the probe 114 does not detect the potential of non-exposure part of FIG. 11 (B) individually but detects the potential of non-exposure part as a mean or a fixed value smaller than the mean. For example, when the potentials of the OFF and ON parts of a wide area laser output are $-750$ V and $-170$ V, respectively, if dot density is 16 dots/mm in the dot pattern of FIG. 11 (B), the mean detected potential $V_S'$ to be obtained from the probe 114 is $-380$ V.

Figure 8:
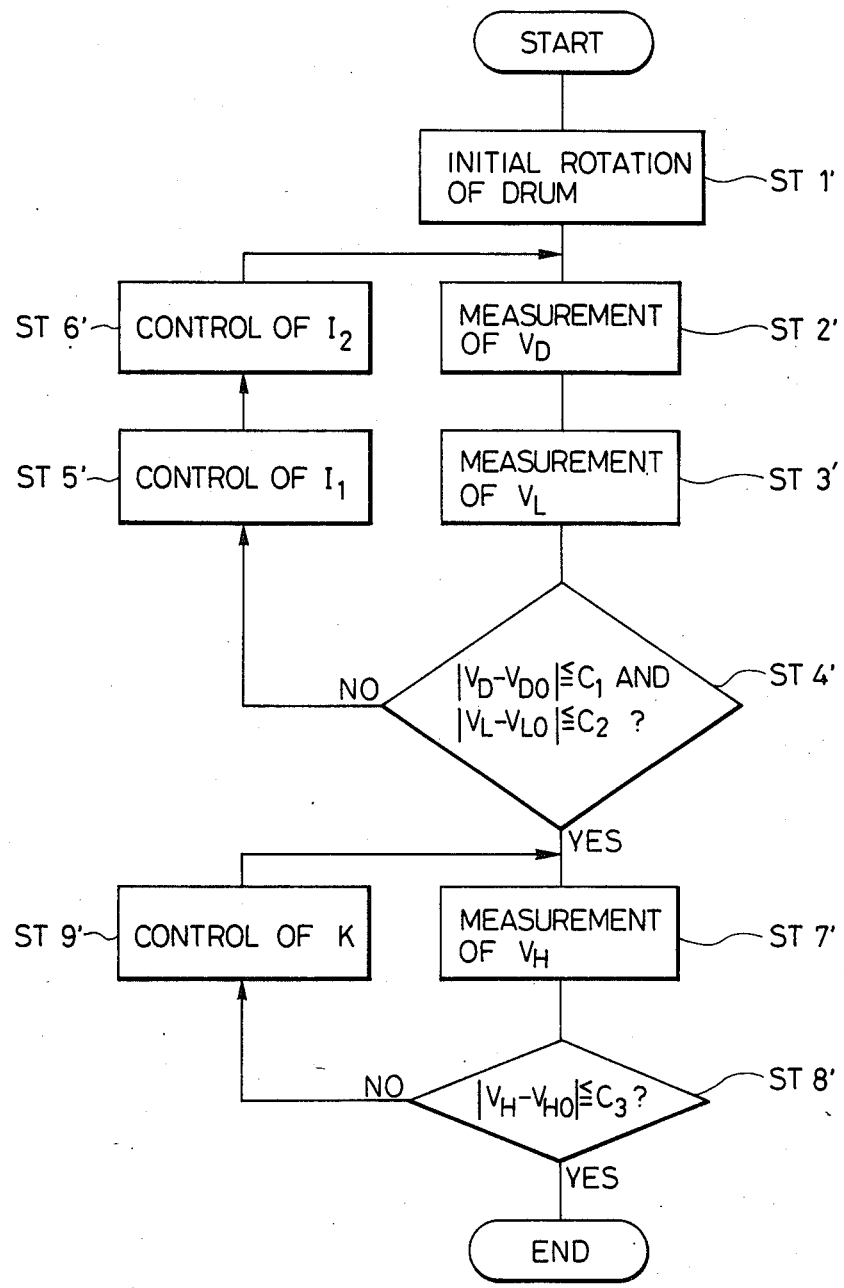
FIG. 8 is a flow chart showing an example of control actions of the device of FIG. 7.

Then, whether the absolute value of difference ($|V_H-V_{H0}|$) between the mean potential $V_H$ of the half-tone pattern measured by the probe 114 in step ST7 of FIG. 8 and a predetermined set point $V_{H0}$ corresponding to that potential is within a predetermined tolerance ($C_3$) is judged (step ST8'). If the judgement result is negative, the reference value K of the output value of convertion data F from the control circuit 117 is changed by $\pm \Delta K$ (step ST9'), the sequence returns to step ST7', and the above operations are repeated. Conversion data F here is a data to be sent to the address of data conversion ROM 129 so as to convert quantized image density level $L_H$ when the standard image density part is read at the CCD 126 to $L'_H = L_H \times (V_{H0}/V_H)$. The data conversion ROM 129 is addressed by the density data L read from the original and the conversion data F to be output from the control circuit 117, and changes the dot area percentage of the dot latent image of the area $S_3$ of FIG. 9 according to the output value of data F, for example, as shown in FIG. 10 (A) through FIG. 10 (C).

Until $|V_H-V_{H0}| \leq C_3$ is satisfied, the operations from step ST7' to step ST9' are repeated. When the judgement result in step ST8' becomes affirmative, the sequence exits from the loop, and potential control operation ends. Here, as the output value when $|V_{H-VH0}| \leq C_3$ is satisfied, K' is set.

In control operation so far described, the charging current $I_1$ of the charger 106, the driving current $I_2$ of semiconductor laser, and the output value F of conversion data F are set so that latent image potentials $V_D$, $V_L$, and $V_H$ come within predetermined values.

Though in the embodiment image data correction is performed at the data conversion ROM 129, image data correction may be made by changing the threshold value at the dither circuit 130.

Coefficients $\chi$, $\beta_1$, and $\beta_2$ in the control equations of the first and the second embodiments indicate the slope of the function in the respective relationship equations.

It is preferable that when the charging current $I_1$ of the charger 6 (106) and the driving current $I_2$ of the semiconductor laser 1 (101) have reached given levels, a limiter (not shown) operates to prevent further level increase so as to protect the high voltage power supply or the semiconductor laser.

Figure 5:
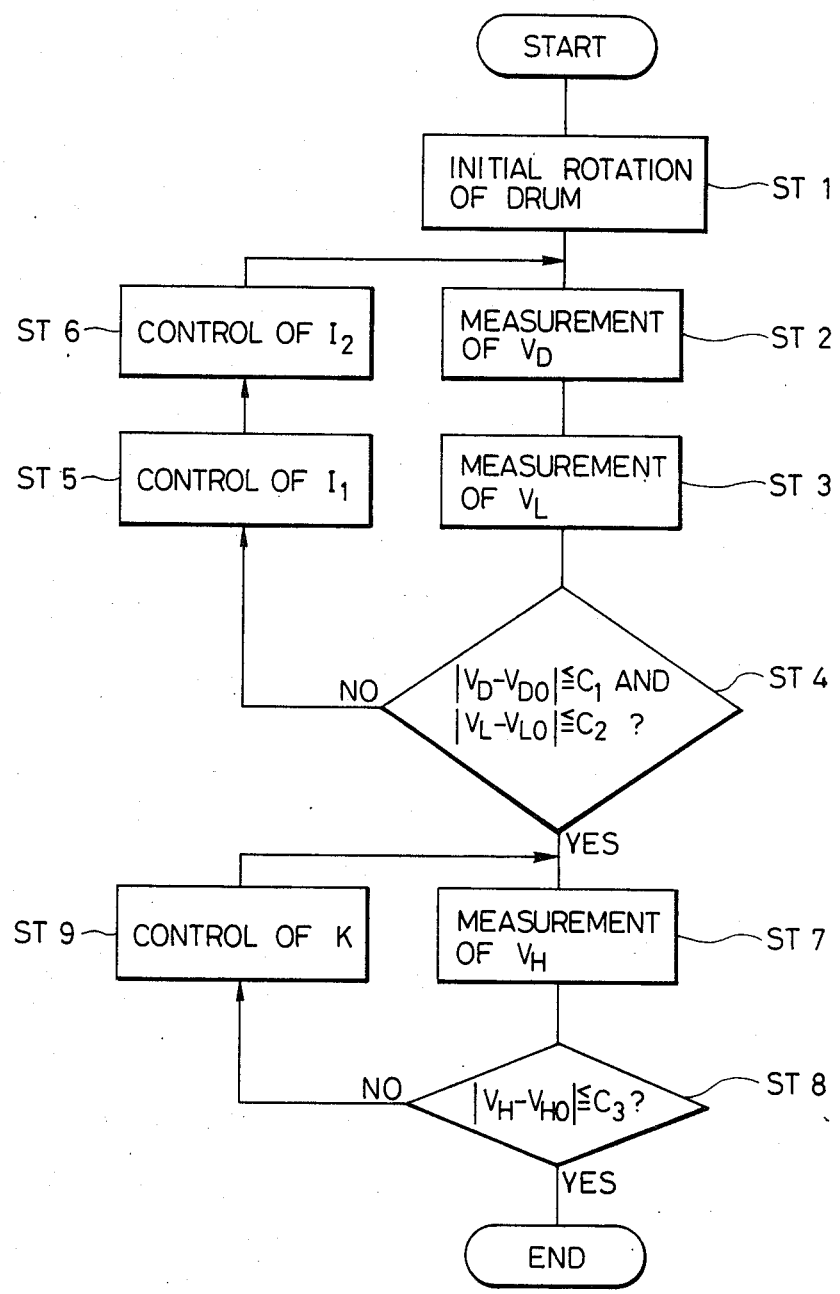
FIG. 5 is a flow chart showing an example of control actions of the device of FIG. 1.
Figure 12:
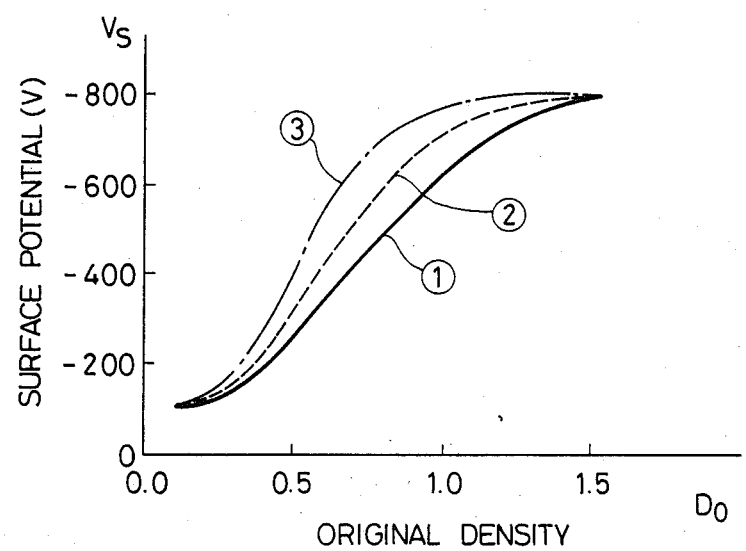
FIG. 12 is a characteristics diagram showing an example of relationship between an original density Do after control action shown in FIG. 5 and FIG. 8 and a surface potential Vs.

FIG. 12 shows an example of latent image characteristics when the gray scale is written to the photosensitive drum 4 (104) as an original image after potential control is performed according to the control procedure shown in FIG. 5 and FIG. 8. The latent image in this case is obtained in such a way that the original information is read at the CCD 25, 126 the video signal read out from the CCD 25, 126 is A/D converted and quantized at the A/D converter 26, 128, the quantized video signal is dither processed at the dither circuit 27, 130, the laser beam passing through the laser control circuit is ON-OFF controlled by supplying the dither processed signal to the laser control circuit 1, 101, and an image is formed by scanning the surface of the photosensitive drum 4, 104 by the laser beam. ①, ②, and ③ of FIG. 12 are those obtained by setting the desired potential of the half-tone part at three different levels in the potential control of FIG. 5 and FIG. 8. The slope $\gamma$ (gamma) of latent image characteristic is greater in the sequence of ① < ② < ③. In the potential control of ①, ②, and ③, the values of both the dark part potential and the bright part potential are to be set so as to correspond.

As described so far, in the prior art device, even when potential control is performed with the dark part potential and the bright part potential set to correspond, a constant half-tone part potential could not be obtained or setting at a desired potential could not be made. According to the embodiment of the present invention, since it is designed that the half-tone potential is directly controlled, the problem of the prior art does not occur, and gamma setting becomes possible.

In addition, even when the setting of a set point of the dark part potential is changed, optimum control may be made since a desired potential of the half-tone part can be set accordingly.

It is preferable that potential control of the half-tone part is performed at a point of potential corresponding to the range of original density from around 0.5 to around 1.0.

In addition, though in this embodiment the potential of latent image is detected, the density itself of the image after being made visible may be measured by a densitometer.

As described above, since the half-tone pattern is formed, the value of the half-tone pattern corresponding to the image density is detected, and image data to be represented is corrected by the detection output, the half-tone can be reproduced at a high fidelity according to the present invention.

In addition, the present invention is applicable not only to any electronic photographing equipment but also to any image recorder capable of controlling the half-tone by the area ratio of the recording portion and the non-recording portion.

Although the present invention has been described in connection with the particular embodiments shown and discussed hereinabove, it is to be expressly understood that many other applications and modifications may be made without departing from the spirit and scope of the present invention.

What is claimed:

1. An image forming device comprising:
   recording means for forming an electrostatic latent image on a recording medium according to image data;
   developing means for developing said electrostatic latent image;
   dot forming means for forming dots on said recording means;
   pattern generation means for forming a predetermined half-tone pattern, made of a plurality of dots, with said dot forming means;
   detection means for detecting a value of said electrostatic latent image on said recording medium corresponding to a density of said predetermined half-tone pattern; and
   correction means for correcting the image data to be recorded by said recording means according to an output from said detection means to control the ratio of the area of the recording portion to the area of the non-recording portion for a predetermined area.

2. The image forming device according to claim 1 wherein said correction means changes the number of said dots in said predetermined area in accordance with said detected output.

3. The image forming device according to claim 1 wherein said pattern generation means has a memory to store said predetermined half-tone pattern.

4. The image forming device according to claim 1 wherein said pattern generation means comprises pickup means for reading a predetermined optical half-tone density and means for forming said half-tone pattern in accordance with an output of said pickup means.

5. The image forming device according to claim 1 further comprising means for controlling said fot of its own.

6. The image forming device according to claim 1 wherein said dot forming means forms dots on a photodensitive member with light.

7. The image forming device according to claim 6 wherein said detection means detects a latent image potential of said photosensitive member.

8. An original reproducing device for reproducing an image on a recording medium, comprising:
   pickup means for reading an image density of an original as an electric output signal;
   conversion means for converting an output signal of said pickup means into one of a binary and a multilevel signal;
   image forming means for forming an image on said recording medium based on the output of said conversion means and for forming half-tone pattern on said recording medium according to an output signal obtained by reading an image of a predetermined reference density by means of said pickup means;

detection means for detecting a value corresponding to a density of said half-tone pattern formed on said recording medium; and control means responsive to the detection output of said detection means for correcting the electric output signal, thereby controlling a ratio between an area of a recording portion and an area of a non-recording portion on said recording medium.

9. The original reproducing device according to claim 8 wherein said recording medium is a photosensitive member and said detection means detects a latent image potential of said half-tone pattern.

10. The original reproducing device according to claim 9 whwerein said image forming means forms a bright part pattern and a dark part pattern on said photosensitive member and said detection means detects the latent image potentials of said bright part pattern and dark part pattern.

11. The original reproducing device according to claim 10 wherein said image forming means includes exposure means for exposing image light on said photosensitive member and said control means varies and controls a light intensity of said exposure means in accordance with the detected output of the latent image of said bright part pattern.

12. The original reproducing device according to claim 10 wherein said image forming means includes charging means for charging a surface of said photosensitive member uniformly and said control means varies and controls a charging output of said charging means in accordance with detected output of the latent image potential of said dark part pattern.

13. The original reproducing device according to claim 11 wherein said control means control said area ratio after control of the light intensity.

14. The original reproducing device according to claim 12 wherein said control means controls said area ratio after control of the charging output.

15. A recorder for reproducing a half-tone image in terms of a ratio between the area of a recording portion and the area of a non-recording portion on a recording medium, said recording comprising:

video signal generating means for generating a video signal to be recorded;

conversion means for converting said video signal into one of binary and multi-level data according to predetermined conversion characteristics to produce a recording signal;

first image forming means for forming an image corresponding to said recording signal;

second image forming means for forming a predetermined density pattern on said recording medium;

detection means for detecting a value corresponding to the density of said predetermined density pattern; and control means for correcting said video signal in response to the detection output of said detection means and outputting the corrected video signal to said conversion means.

16. A recorder according to claim 15 further comprising a second image forming means for forming a predetermined density pattern on said recording medium and detection means for detecting a value corresponding to the density of asid predetermined density pattern, and wherein said control menas is responsive to the output of said detection means for correcting the conversion characterized of said control means.

17. A recorder according to claim 15 wherein the recording is made by dots and said control means changes the number of the recorded dots in a predetermined area.

18. A recorder according to claim 16 wherein the recording is made by dots and said control means changes the number of the recorded dots in a predetermined area, depending upon the output of said detection means.

19. The recorder according to claim 15 wherein said recording medium is a photosensitive member.

* * * * *

UNITED STATES PATENT AND TRADEMARK OFFICE
CERTIFICATE OF CORRECTION

PATENT NO. : 4,680,646          Page 1 of 3
DATED : July 14, 1987
INVENTOR(S) : YOSHINORI IKEDA, ET AL.

It is certified that error appears in the above-identified patent and that said Letters Patent is hereby corrected as shown below:

On the title page, Item [56]

Under Primary Examiner - "E. A. Golberg" should read --E. A. Goldberg--.

COLUMN 1

Lines 13-4, "photograph" should read --photographic--.
    Line 31, "forms" should read --forming--.

COLUMN 2

Line 10, "configuratrion" should read --configuration--.
    Line 16, "FIG." should read --FIGS.--.

COLUMN 3

Line 10, "12.," should read --12.--.

COLUMN 4

Lines 33-4, "measured $V_L$" should read --measured value $V_L$--.
    Line 43, "$V_C$" should read --$V_D$--.
    Line 63, "relates" should read --results--.

COLUMN 6

Line 51, "two-dimentional" should read --two-dimensional--.
    Line 52, "orgaric" should read --organic--.

UNITED STATES PATENT AND TRADEMARK OFFICE
CERTIFICATE OF CORRECTION

PATENT NO. : 4,680,646
DATED : July 14, 1987
INVENTOR(S) : YOSHINORI IKEDA, ET AL.

It is certified that error appears in the above-identified patent and that said Letters Patent is hereby corrected as shown below:

COLUMN 8

Line 47, "convertion" should read --conversion--.
Line 66, "$V_{VHO}$" should read --$V_{HO}$--.

COLUMN 9

Line 23, "CCD 25, 126" should read --CCD 25, 126,--.
Line 68, "photographing" should read --photographic--.

COLUMN 10

Line 46, "fot" should read --dot--.
Lines 46-7, "of its own" should read --on its own--.
Lines 49-50, "photodensitive" should read --photosensitive--.

COLUMN 11

Line 14, "whwerein" should read --wherein--.
Line 34, "control" should read --controls--.

UNITED STATES PATENT AND TRADEMARK OFFICE
CERTIFICATE OF CORRECTION

PATENT NO. : 4,680,646

DATED : July 14, 1987

INVENTOR(S) : YOSHINORI IKEDA, ET AL.

It is certified that error appears in the above-identified patent and that said Letters Patent is hereby corrected as shown below:

COLUMN 12

Line 2, "recording" should read --recorder--.
    Line 24, "asid" should read --said--.
    Line 26, "menas" should read --means--.
    Line 28, "characterized" should read --characteristics--.

Signed and Sealed this

Twenty-second Day of June, 1993

Attest:

MICHAEL K. KIRK

*Attesting Officer*     *Acting Commissioner of Patents and Trademarks*